May 22, 1962

M. BRUMA 3,036,197

APPARATUS FOR MACHINING PIECES BY MEANS OF
INTERMITTENT ELECTRICAL DISCHARGES

Filed July 25, 1960

INVENTOR
MARC BRUMA
BY
Bailey, Stephens & Huettig
ATTORNEYS

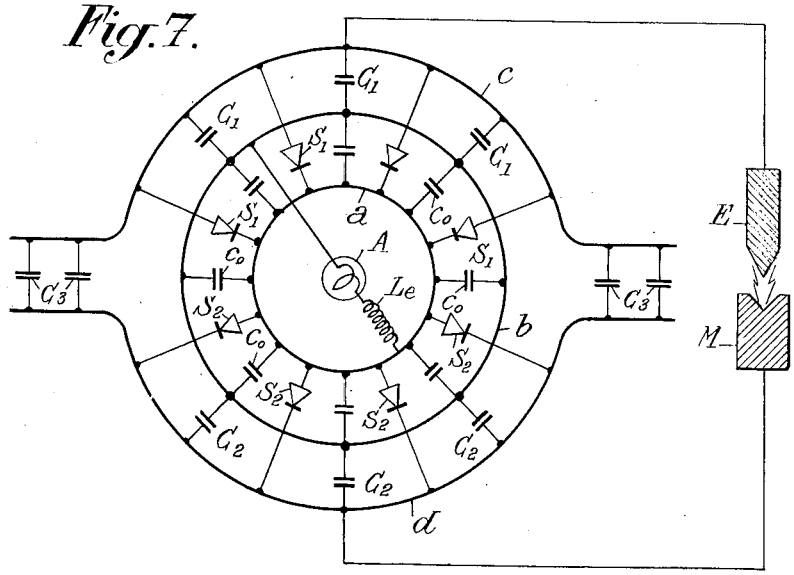
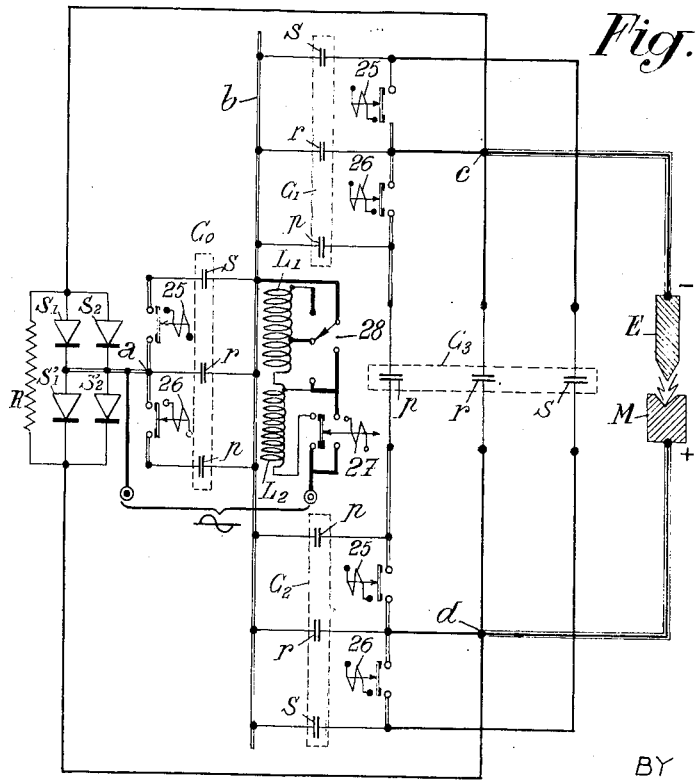

United States Patent Office 3,036,197
Patented May 22, 1962

3,036,197
APPARATUS FOR MACHINING PIECES BY MEANS OF INTERMITTENT ELECTRICAL DISCHARGES
Marc Bruma, Sceaux, France, assignor to Centre National de la Recherche Scientifique, Paris, France, a society of France
Filed July 25, 1960, Ser. No. 45,052
Claims priority, application France Sept. 2, 1959
8 Claims. (Cl. 219—69)

The present invention relates to apparatus for machining pieces by means of intermittent electrical discharges, that is to say to apparatus making use of the electro-erosion phenomenon for machining pieces of an electroconductive metal or alloy, whatever be the hardness thereof, by means of intermittent electrical discharges localized between these pieces and electrodes (tools) made of electroconductive materials or alloys the hardness of which may be substantially lower than that of said pieces. The object of the present invention is to provide an apparatus of this kind which is better adapted to meet the requirements of practice than those known up to the present time, in particular in order to obtain a quicker, finer and more accurate machining, while working at high frequencies under lower voltages and with higher current intensities without any risk of damage in case of accidental short-circuit occurring between the tool and the piece.

According to the present invention, the circuit comprising the tool and the piece of work belongs to one of the diagonals of a circuit forming a bridge of capacitors, self-inductance coils and current rectifiers, said bridge being balanced in such manner that, in normal working conditions (machining by means of intermittent electrical discharges), the total reactance is zero or close to zero, whereas in the case of an accidental short-circuit between the tool and the piece of work, the unbalance thus caused to the bridge produces at the terminals of the reciprocating current source located in the other diagonal of said bridge a total reactance sufficiently high to limit the current supplied by said source to an intensity lower than the normal working current.

Preferred embodiments of the present invention will be hereinafter described with references to the accompanying drawings given merely by way of example and in which.

Figure 1:
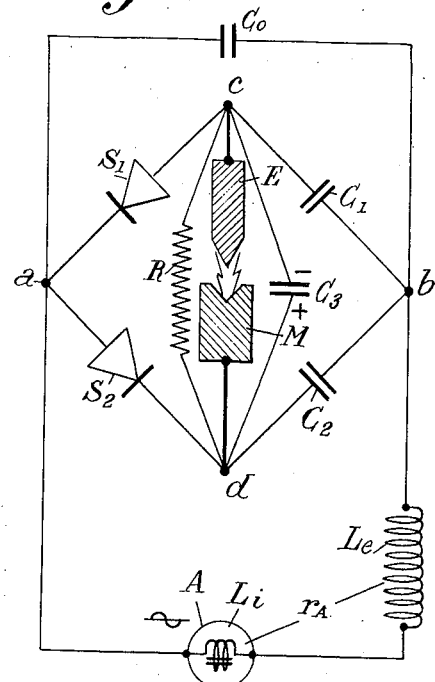
FIG. 1 is the electrical layout of an apparatus made according to the present invention.

FIGS. 6 and 7 diagrammatically shown two embodiments of the invention.

It should be reminded that the rate of removal of the material by electro-erosion and therefore the rate of machining are substantially proportional to the mean power of the discharges, whereas the unevenness or roughness of the machined surfaces increases with the peak voltage of said discharges.

In order to increase the rate of machining it is therefore necessary to act on the frequency, the duration, the voltage and the current of the discharges, but in such manner that the wear of the electrode and the roughness of the surfaces are not increased in the same proportion. The use of high voltages is not without drawback because on the one hand a high voltage, by increasing the gap between the tool and the piece, reduces the accuracy, the faithfulness of reproduction and the regularity of erosion, increases the roughness and furthermore imposes supplementary precautions in order to protect the operator against these high voltages.

A study of the mechanism of electro-erosion shows that the generator must produce intensive discharges under low voltage and at a high frequency. On the other hand, an accidental short-circuit between the tool and the piece must not cause rises of voltage or intensity capable of injuring the surface of said piece. It is therefore of interest to keep the voltage at a value as low as possible and to act upon the current, the frequency and the duration of the discharges in such manner as to increase the mean intensity of the series of discharges. But up to the present time it has been impossible to proceed in this way for the following reasons:

(a) It is difficult from a technical point of view to produce impulses of high frequency and current under a low voltage;

(b) The dangers produced by short-circuit between the tool and the piece are great because, for high intensities, welding may occur between the tool and the piece and the generator itself may be in danger.

One of the purposes of the present invention is to obtain a quick, accurate, regular machining with a limited roughness by making use of high intensities under a low voltage, without risks of damages in case of short-circuits, the arrangement according to the invention acting, in the case of an accidental short-circuit between the tool and the piece, in the following manner:

On the one hand it causes most of the current supplied by the source to flow outside of the short-circuited zone, and on the other hand it causes the intensity of this current to be automatically reduced during the duration of the short-circuit.

For this purpose, the generator of the apparatus according to the present invention includes a suitable alternator A (FIG. 1), for instance arranged to be able to supply a sinusoidal current of some hundreds of effective amperes under a voltage lower than 100 volts with a frequency ranging from 3000 to 12,000 periods, this generator having its output connected, through a suitable self-inductance coil $L_e$, to a capacitor such as $C_0$ and being inserted in an electric bridge which ensures the transformation of the alternating current into unidirectional impulses, this bridge further comprising the machining circuit, the resistance, self-inductance and capacity characteristics of the various elements being calculated in such manner as to comply with the conditions above mentioned, as it will be hereinafter described.

On FIG. 1, this bridge is shown at $abcd$, source A being branched between points $a$ and $b$, the current being rectified by the combination of two rectifiers $S_1$, $S_2$, preferably of the silicon diode type, and of two capacitors $C_1$, $C_2$, so that the branches $S_1$, $C_1$ and $S_2$, $C_2$ constitute the charging circuit. The diagonal of the bridge, which extends between points $c$ and $d$, constitutes the discharge or machining circuit which comprises, in the example shown, electrode E and the piece of work M. This discharge circuit may also comprise a capacitor or energy accumulator $C_3$ (for instance with a delay line) and also a resistor in parallel R.

$r_A$ is the resistance of the alternator and that of self-inductance coil $L_e$, and $L_i$ is the internal self-inductance of the alternator.

Now this bridge is balanced in such manner, by a suitable calculation of the parameters, that, in normal working conditions (machining by intermittent electrical discharges), the total reactance is zero or close to zero, whereas, in the case of an accidental short-circuit between the tool and the piece, the unbalance thus imparted to the bridge produces across the terminals of the alternating source a reactance sufficiently high to limit automatically the current supplied by said source to a value lower than the normal working current.

Figure 2:
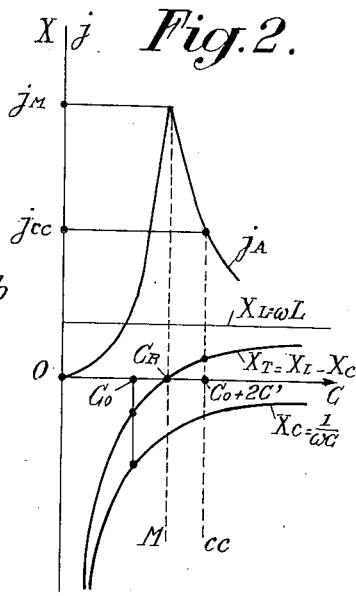
FIG. 2 shows a curve to facilitate the interpretation of the operation of the apparatus.

The operation is illustrated by the curves of FIG. 2.

On said curves, established in the case of an alternating source of a pulsation $\omega=2\pi f$ constant, the capacities C are plotted in abscissas whereas the ordinates represent: on the one hand the reactances X, which are $$X_L = \omega L \text{ and } X_C = \frac{1}{\omega C}$$

and on the other hand, the intensity $j$ of the current supplied by the source.

The total reactance of the circuit, equal to $(X_L - X_C)$, varies in the manner shown by the arc of hyperbola $X_T$ which cuts the axis of abscissas for a value $C_R$ of a capacity defining the condition for a reactance equal to zero:

$$(1) \qquad \omega(L_i + L_e) = \frac{1}{\omega C_R}$$

where $L_i$ and $L_e$ designate the values of the self-inductances indicated by the same references on FIG. 1.

In this case, the source supplies a current of maximum intensity $jM$ whereas, for other values of capacity C, greater or smaller than $C_R$, the intensity of the current supplied by the same source remains constantly lower than value $jM$ and may be calculated according to the following equation:

$$(2) \qquad j/jM = \left[1 + \frac{C_R}{C} Q^2 \left(\frac{C}{C_R} - 1\right)^2\right]^{-1/2}$$

in which Q represents the total Q factor defined by (3) and supposed to be at least equal to 5:

$$(3) \qquad Q = \omega \frac{(L_i + L_e)}{r_A} \geq 5$$

resistance $r_A$ being that of self-inductances $L_i$ and $L_e$.

Normal operation (abscissas M, FIG. 2) and operation in case of a short-circuit between the electrode and the piece (abscissa $cc$) will now be examined successively. Considering first normal operation conditions, it is found that, during one of the alternations of the current wave emitted by source A, capacitor $C_3$ is charged through rectifier $S_2$ and capacitor $C_1$, whereas, during the other alternation, the same capacitor $C_3$ is charged through rectifier $S_1$ and capacitor $C_2$ while always keeping a constant polarity at the terminals $c$ and $d$. It may therefore be considered that, during every alternation, the alternating source A has its output connected to a system of capacitors the total capacity of which is:

$$C_0 + C' + \frac{C' \cdot C_3}{C' + C_3}$$

it being supposed that $C_1 = C_2 = C'$, in series with a total self-inductance $(L_i + L_e)$. In these conditions, the curves of FIG. 2 show that source A will supply the maximum current if the capacities comply with relation 4 in which K is the ratio $C_3/C'$:

$$(4) \qquad C_0 + C' \cdot \left[1 + \frac{K}{1+K}\right] = C_R$$

At the time where the voltage between terminals $c$, $d$ reaches the critical value for the production of the discharge between the tool and the piece, capacitor $C_3$ is discharged, producing a polarized current impulse the amplitude and duration of which depend essentially upon the electrical parameters of the discharge circuit. At the end of this discharge, an identical cycle is produced leading to the formation, between the tool and the piece, of a polarized impulse wave of current the repetition frequency of which may be several times greater than the frequency of the alternating source A.

The operation in case of the short-circuit will now be examined.

Figure 3:
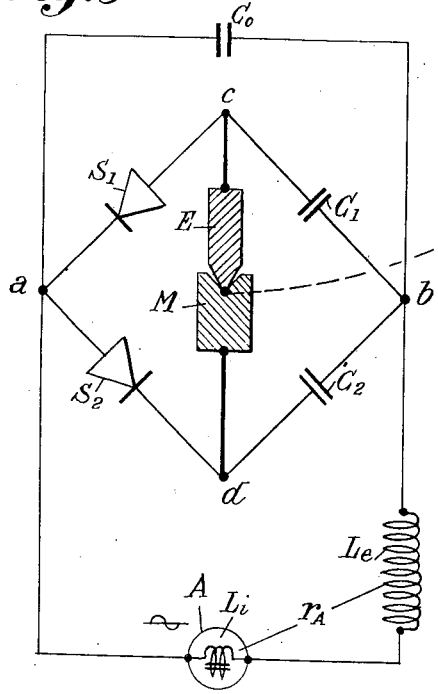
FIGS. 3, 4 and 5 show electrical layouts equivalent to that of FIG. 1 when a short-circuit is produced between the tool and the piece of work.
Figure 4:
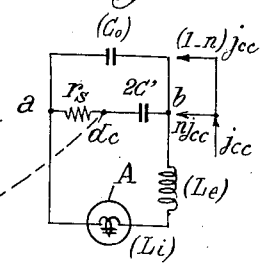
Figure 5:
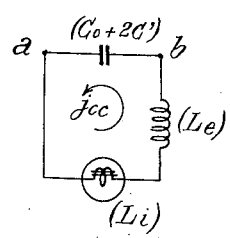

When the tool comes into contact with the piece, points $c$ and $d$ are electrically connected (capacitor $C_3$, if it exists, being short-circuited) and the electric layout is then that of FIG. 3. The two branches $adb$ and $acb$ of the bridge, having a capacity $C_1 = C_2 = C'$ may then be considered as equivalent to a single branch of a capacity equal to $2C'$, mounted in shunt across capacitor $C_0$ and through which passes successively each of the alternations, the resistance $r_s$ being that of the rectifiers $S_1$ and $S_2$ when current is flowing. This last mentioned resistance is low and may be neglected in first approximation so that the diagram of FIG. 4 is equivalent to that of FIG. 5 where $(C_0 + 2C')$ designates a capacitor equivalent to the two capacitors $C_0$ and $2C'$ mounted in shunt.

It thus appears that the short-circuit produces an unbalance of the bridge such that, during every alternation, the alternating source A is connected with a system of capacitors having a total capacity $(C_0 + 2C')$ which is higher than in the case of normal operation. If, in normal operation, the bridge has been balanced according to equation 4, then the short-circuit between the tool and the piece causes the following unequalities:

$$(5) \qquad C_0 + 2C' > C_R \text{ and } X_L > X_c$$

On FIG. 2, the straight line having the value $(C_0 + 2C')$ as abscissa cuts curve $j_A$ at a point the ordinate of which $j_{cc}$ (peak intensity of the short-circuit current) is lower than $jM$ (intensity of the current in normal working conditions) and depends upon the difference $\Delta C$ between the total capacity of the bridge in short-circuit conditions and in normal working conditions, respectively. This difference results from formulas 4 and 5 and may be expressed by:

$$(6) \qquad \Delta C = C' \cdot \left(1 - \frac{K}{1+K}\right)$$

and it is found that this difference is independent from $C_0$.

Three particular cases, which constitute limits, may be considered:

$$(7) \qquad \begin{array}{l} \text{(I) } C_0 \neq 0 \text{ and } C_3 = 0 \\ \text{(II) } C_0 = 0 \text{ and } C_3 \neq 0 \\ \text{(III) } C_0 = 0 \text{ and } C_3 = 0 \end{array}$$

For each of these cases, Equation 4 enables the bridge to be balanced in normal working conditions and it is also possible to comply with unequality 5 which limits the current supplied by the source in the case of a short-circuit between the tool and the piece. As a matter of fact:

(8)

(I) $C_0 + C' = C_R$ and $\Delta C = C'$ (II) $C' \cdot \left(1 + \frac{K}{1+K}\right) = C_R$ and $\Delta C = C'' \left(1 - \frac{K}{1+K}\right)$ (III) $C' = C_R$ and $\Delta C = C'$ At the same time, an examination of FIGS. 3 and 4 shows that through the short-circuit zone there passes only a fraction $$\frac{1}{2}n$$

of current $j_{cc}$, the remainder being caused to pass through capacitor $C_0$ outside of the short-circuit zone. The value of $n$ depends upon the choice of capacities $C_0$ and $C'$ and is calculated according to the following relation:

$$(9) \qquad n = \frac{2C'}{C_0 + 2C'}$$

It will be seen that $n$ does not depend upon $C_3$ and that its value remains lower than 1 except in the case $C_0 = 0$ where $n = 1$. This is only a limit case and as a rule $n$ should be lower than 1.

If capacitors $C_0$ and $C_3$ are not quite necessary for a correct operation, on the contrary capacitors $C_1$ and $C_2$, associated with rectifiers $S_1$ and $S_2$, form the essential elements of the circuit.

It should be noted that advantageously the resonance curve $j_A$ must be as sharp as possible, because from this condition also depends a lowering of the value of the ordinate of the short-circuit current $j_{cc}$. The shape of said curve depends upon the Q factor above referred to (Equation 3) and it is advantageous to give these two factors a value higher than 5, by a suitable choice of the values of $L_i$, $L_e$ and $r_A$.

To sum up, it is found that with the circuit that is proposed it becomes possible, in the case of a short-circuit between the tool and the piece:

(1) Automatically to lower the intensity supplied by the source, which protects the source itself and the whole of the elements of the circuit, in particular the rectifiers, against dangerous rises of intensity;

(2) To cause most of the current then supplied by the source to flow away from the short-circuit zone between the tool and the piece, which protects the piece against the dangerous effects of a local rise of intensity and prevents the formation of a stable arc;

(3) To obtain this double protection in a wholly automatic and instantaneous manner, without dissipation of energy in the resistances used to limit the current and without making use of auxiliary relays or switches.

With reference to FIGS. 6 and 7, two embodiments of the invention will now be described.

In the construction of FIG. 6, each of the capacitors designated by $C_0$, $C_1$, $C_2$, $C_3$ consists of at least one of the three capacitors $p$, $r$, $s$, mounted in shunt, the junction points $a$, $b$, $c$ and $d$ of the bridge being then given the form of conductor plates.

Three synchronized electro-magnetic contactors 25 make it possible to mount in shunt between them the capacitors $p$, $r$ of every group, and three other contactors 26, similarly synchronized, permit of mounting the capacitors $r$ and $s$ of every group in shunt.

Four conditions of operation are then possible:

Blank forming conditions, rough working conditions, finishing conditions and super-finishing conditions, the device working respectively with the $r$ capacitors, either alone, or with the $p$ and $r$ capacitors in shunt, or with the $r$ and $s$ capacitors in shunt, or with the $p$, $r$ and $s$ capacitors in shunt.

Such an arrangement is particularly advantageous in that it permits of making use of some harmonics of the frequency of source A, for instance in order to work in the finishing conditions, the capacity corresponding to resonance for the harmonic of order $n$ being $n^2$ times smaller than that corresponding to the fundamental frequency.

Two contactors 27 and 28 act on the number of turns of the self-inductance coil $L_e$ making it possible to give the inductance of this coil suitable values for the conditions that are considered, which permits in particular of varying the Q factor.

In the embodiment of FIG. 7, the junction points $a$ and $b$ of the bridge consist of two coaxial cylindrical drums made of sheets of conductor material and the points $c$ and $d$ consist respectively of the two halves of a third drum concentric with the two others.

Each of the capacitors $C_0$, $C_1$, $C_2$, $C_3$ consists of several elementary capacitors mounted in shunt between the corresponding drums or portions of drums and self-inductance coil $L_e$ is housed on the inside of the inner drum which corresponds to the junction point $a$.

This coaxial arrangement reduces to a minimum the self-inductance and also the parasitic resistances of the cables; it greatly simplifies the construction of the discharge generator and is particularly well adapted to the circulation of a current impulse of high frequency and intensity.

A generator made according to the present invention has made it possible to obtain a removal of 5200 cubic millimeters per minute of hard steel, for a mean power of 35 kw. absorbed from the electrical network. In these conditions, the mean depth of the holes formed in the piece is about 100 microns, the wear of the electrode remaining lower than 10%.

In a general manner, while the above description discloses what is deemed to be a practical and efficient embodiment of the invention, it should be well understood that there might be changes made in the arrangement, disposition and form of the parts without departing from the principle of the invention as comprehended within the scope of the accompanying claims.

What I claim is:

1. A spark machining apparatus for treating a piece of work which comprises, in combination, a source of alternating electrical energy, a tool forming a first electrode, said piece of work forming a second electrode separated by a discharge gap from the first one, and a circuit forming an electric bridge, said bridge having four sides and two diagonals, one of said diagonals comprising in series said first electrode, said gap and said second electrode, the other of said diagonals containing said source and a self-inductance coil connected in series with said source in said second mentioned diagonal, two capacitors inserted respectively in the two sides of said bridge extending from one end of said second mentioned diagonal, two rectifiers inserted respectively in the two other sides of said bridge, which extend from the other end of said second mentioned diagonal, one of said rectifiers permitting current to flow only toward said last mentioned end of the second diagonal and the other rectifier permitting current to flow only away from said last mentioned end of the second diagonal, a third capacitor mounted across the ends of the second mentioned diagonal, a fourth capacitor mounted across the ends of the first mentioned diagonal, the capacity $C_0$ of said third capacitor being lower than the value $C_R$ of the capacity of the whole circuit for which said circuit is in resonance at the frequency of said source, said bridge being balanced so that in normal working conditions, when the machining electrical discharges are produced, the total reactance of said circuit is zero, whereby, in case of an accidental short-circuit occurring between said tool and said piece, the total reactance of the circuit becomes high enough to limit the current supplied by said source automatically and instantaneously to a value lower than the normal operation current.

2. An apparatus according to claim 1 further including means forming a delay line mounted across the ends of said first diagonal.

3. An apparatus according to claim 1 in which the Q factor of the circuit is higher than 5.

4. An apparatus according to claim 1 in which each of the two first mentioned capacitors has a capacity equal to $C'$ and $C_0$ is equal to the difference between $C_R$ and $C'$.

5. An apparatus according to claim 1 in which each of the two first mentioned capacitors has a capacity equal to $C'$ and $C_0$ is at least equal to 2 $C'$.

6. An apparatus according to claim 1 in which each of said capacitors comprises a plurality of shunt mounted elementary capacitors, other capacitors being provided for assembling said elementary capacitors together, the junctions of the bridge consisting of conductor plates.

7. An apparatus according to claim 1 in which each of the junctions of the bridge consists of at least a portion of a cylindrical drum made of a sheet of a conducting material.

8. An apparatus according to claim 6 comprising several concentric drums between which are mounted the elements forming said bridge.

References Cited in the file of this patent

FOREIGN PATENTS 756,727    Great Britain _____ Sept. 5, 1956